United States Patent [19]

Kitagishi

[11] Patent Number: 5,751,480
[45] Date of Patent: May 12, 1998

[54] PLATE-LIKE POLARIZING ELEMENT, A POLARIZING CONVERSION UNIT PROVIDED WITH THE ELEMENT, AND A PROJECTOR PROVIDED WITH THE UNIT

[75] Inventor: Nozomu Kitagishi, Hachioji, Japan

[73] Assignee: Canon Kabushiki Kaisha, Tokyo, Japan

[21] Appl. No.: 865,076

[22] Filed: Apr. 8, 1992

[30] Foreign Application Priority Data

Apr. 9, 1991 [JP] Japan ................................ 3-103317

[51] Int. Cl.⁶ ........................ G02B 5/30; G02B 27/28
[52] U.S. Cl. .................. 359/485; 359/487; 359/495; 359/497
[58] Field of Search ................. 359/483, 484, 359/485, 486, 487, 490, 494, 495, 496, 497, 498, 499, 583, 618, 629, 634, 636

[56] References Cited

U.S. PATENT DOCUMENTS

| | | | |
|---|---|---|---|
| 2,748,659 | 6/1956 | Geffcken et al. | 359/487 |
| 2,811,077 | 10/1957 | Wiemer et al. | 359/497 |
| 3,449,051 | 6/1969 | Levitt | 359/636 |
| 3,743,378 | 7/1973 | Bousky | 359/636 |
| 3,743,380 | 7/1973 | Fugitt | 359/487 |
| 3,876,285 | 4/1975 | Schwarzmuller | 359/487 |
| 4,020,336 | 4/1977 | Linder | 359/494 |
| 4,358,200 | 11/1982 | Heemskerk et al. | 359/640 |
| 4,392,729 | 7/1983 | Tsunfugi | 359/636 |
| 4,560,999 | 12/1985 | Tokuhara | 346/160 |
| 4,641,926 | 2/1987 | Shirasaki | 359/487 |
| 4,863,246 | 9/1989 | Anthon | 359/487 |
| 4,864,390 | 9/1989 | McKechnie et al. | 358/60 |
| 4,989,076 | 1/1991 | Owada et al. | 358/61 |
| 5,566,367 | 10/1996 | Mitsutake et al. | 359/495 |

FOREIGN PATENT DOCUMENTS

| | | | |
|---|---|---|---|
| 1041633 | 10/1953 | France | 359/496 |
| 180512 | 10/1984 | Japan | 359/495 |
| 61-90584 | 5/1986 | Japan . | |
| 34104 | 2/1987 | Japan | 359/496 |
| 43120 | 2/1988 | Japan | 359/487 |
| 183402 | 7/1988 | Japan | 359/496 |

*Primary Examiner*—Ricky D. Shafer
*Attorney, Agent, or Firm*—Morgan & Finnegan L.L.P.

[57] ABSTRACT

This specification discloses a polarizing element for dividing light into first and second polarized lights differing in polarized state from each other by a polarizing dividing surface, directing the first polarized light in a first direction, reflecting the second polarized light by a reflecting surface and directing it in the first direction, and varying the polarized state of at least one of the first and second polarized lights to thereby make the polarized states of the first and second polarized lights coincident with each other, characterized in that the polarizing dividing surface is disposed on one surface of a plane parallel plate and the reflecting surface is disposed on the other surface of the plane parallel plate, and the light enters obliquely from the one surface or the other surface. The specification also discloses a polarizing conversion unit provided with such polarizing element, and a projector provided with such polarizing conversion unit.

9 Claims, 17 Drawing Sheets

PRIOR. ART

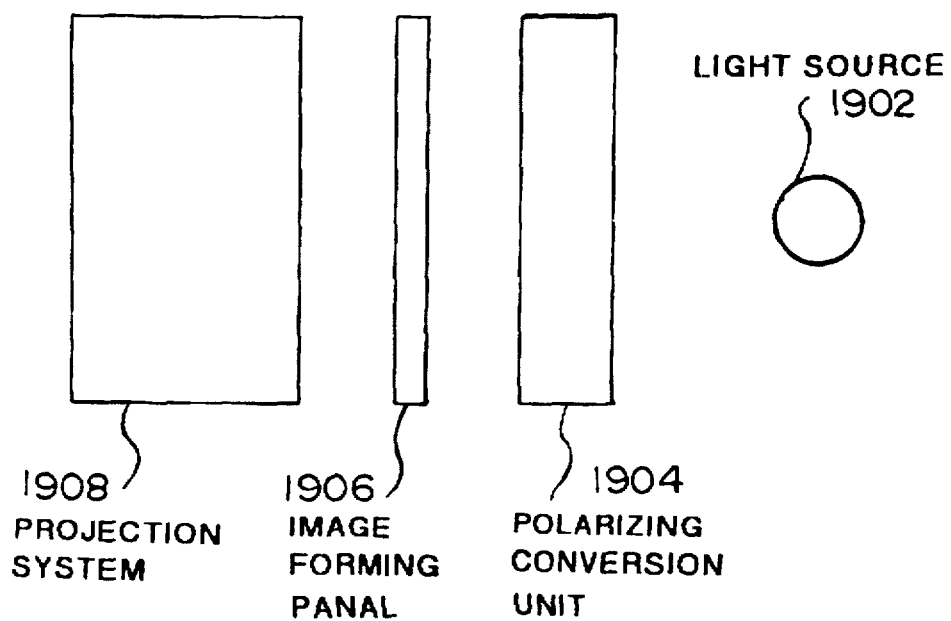

PLATE-LIKE POLARIZING ELEMENT, A POLARIZING CONVERSION UNIT PROVIDED WITH THE ELEMENT, AND A PROJECTOR PROVIDED WITH THE UNIT

BACKGROUND OF THE INVENTION

1. Field of the Invention

This invention relates to a polarizing element from which incident light having random polarization direction components emerges with the polarization direction uniformized, and a projector using such polarizing element.

2. Related Background Art

There is known a projector of the construction as shown in FIG. 1 of the accompanying drawings.

A light beam emitted from a light source 1550 is separated into red, green and blue lights by dichroic mirrors 1551 and 1552, and the red, green and blue lights are directed to liquid crystal light bulbs 1554, 1555 and 1556, respectively, by the use of a total reflection mirror 1553 and further, the optical paths of these lights are bent by a total reflection mirror 1557, and the three red, green and blue images are combined by dichroic mirrors 1558 and 1559 and the combined image is projected onto a screen, not shown, by a projection lens 1560.

Such a projector adopts a construction in which the liquid crystal light bulbs 1554, 1555 and 1556 assume a form in which a liquid crystal plate is interposed between two polarizing plates which are polarizing elements and when natural light having random polarization directions enters the incidence side polarizing plate, polarized lights in the other polarization directions than one polarization direction are absorbed by said incidence side polarizing plate and only the light in one polarization direction enters the liquid crystal plate.

On the other hand, the projector described in Japanese Patent Laid-Open Application No. 61-90584 adopts a construction in which the incidence side polarizing plate is eliminated and instead, by the use of a prism and a beam splitter which is a polarizing element, light is caused to enter a liquid crystal plate with the polarization directions thereof uniformized in one direction.

However, the projector shown in FIG. 1 suffers from the problem that lights in the other polarization directions than the polarization direction of the polarized light transmitted through the incidence side polarizing plate are absorbed by the incidence side polarizing plate and therefore the projection image field becomes dark, and further suffers from the problem that the temperature of the liquid crystal plate is increased by the absorbed lights, thus resulting in the deterioration of the liquid crystal plate.

On the other hand, in the projector described in Japanese Patent Laid-Open Application No. 61-90584, the use of the polarizing beam splitter and the prism leads to the bulkiness of the apparatus and moreover, there is the problem that labor and cost are required for the polarizing of the prism. Also, the use of a glass block such as a prism leads to too great a weight, which in turn leads to bad portability as a projector.

SUMMARY OF THE INVENTION

It is the object of the present invention to realize a polarizing element which can efficiently use incident light and can realize a low-cost and compact projector.

The polarizing element of the present invention is provided on one surface of a transparent plane parallel plate with polarizing separating film for dividing incident light entering the plane parallel plate from said one surface or the other surface side into reflected light and transmitted light, and reflects one of said reflected light and said transmitted light by a reflecting surface provided on said other surface of said transparent plane parallel light and directs it to an optical path substantially parallel to the optical path of the other light, and varies the polarized state of at least one of said reflected light and said transmitted light to thereby make the polarized states of the two lights coincident with each other.

Also, the polarizing conversion unit of the present invention is provided with an illuminating system for supplying non-polarized light having polarized components in lattice-like random directions, and a polarizing element provided obliquely with respect to the optical axis of said illuminating system to convert said non-polarized light into substantially dense polarized light, said polarizing element having a transparent plane parallel plate provided with polarizing separating film on one surface thereof, one of lattice-like reflected light and lattice-like transmitted light created by said polarizing separating film being reflected by a reflecting surface provided on the other surface of the transparent plane parallel plate and being directed to an optical path substantially parallel to the optical path of the other light, the polarized state of at least one of said lattice-like reflected light and said lattice-like transmitted light being varied to thereby make the polarized states of the two lights coincident with each other.

Also, the projector of the present invention is a projector provided with a light source emitting non-polarized light, an illuminating optical system for converting the non-polarized light from said light source into polarized light, an image generator for modulating said polarized light in conformity with a video signal to thereby generate an image, and a projecting optical system for projecting said image, said illuminating optical system having a converting system for converting said non-polarized light into a lattice-like light pattern, and a polarizing element provided obliquely with respect to the optical axis of said converting system to convert said lattice-like light pattern into substantially dense polarized light, said polarizing element having a transparent plane parallel plate provided with polarizing separating film on one surface thereof, one of lattice-like reflected light and lattice-like transmitted light created by said polarizing separating film being reflected by a reflecting surface provided on the other surface of the transparent plane parallel plate and being directed to an optical path substantially parallel to the optical path of the other light, the polarized state of at least one of said lattice-like reflected light and said lattice-like transmitted light being varied to thereby make the polarized states of the two lights coincident with each other.

BRIEF DESCRIPTION OF THE DRAWINGS

FIG. 19 illustrates a projector system including a polarizing conversion unit according to the present invention.

DETAILED DESCRIPTION OF THE PREFERRED EMBODIMENTS

Figure 2:
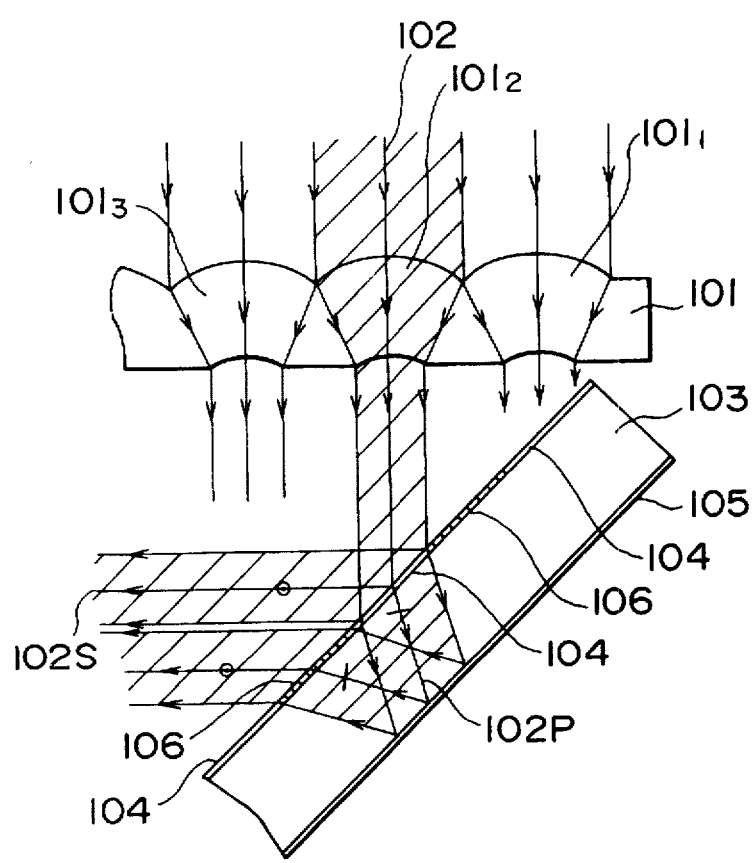
FIG. 2 shows the construction of a first embodiment of the present invention.

FIG. 2 shows the construction of a first embodiment of the present invention.

The present embodiment is comprised of a condensing lens 101 which is a resin molded article comprising cylindrical minute lenses $101_1$, $101_2$ and $101_3$ and which is an illuminating system emitting incident light as lattice-like non-polarized light, and a plane parallel plate 103 of a transparent optical material provided at an angle of 45° with respect to the optical axis of the condensing lens 101. The incidence side surface and the emergence side surface of each of the cylindrical minute lenses $101_1$, $101_2$ and $101_3$ have positive power and negative power, respectively, and the negative power has magnitude twice as great as the positive power, and each of the cylindrical minute lenses has the function of an afocal converter from which the incident light which is parallel light emerges as parallel light having ½ of the width thereof.

On that side of the plane parallel plate 103 which is adjacent to the condensing lens 101, pairs of polarizing separating film 104 formed of multilayer film of a dielectric material or the like and film-like half wavelength plates (half wavelength film) 106 are provided in a stripe-like pattern at the pitch of the cylindrical minute lenses $101_1$–$101_3$ as viewed from the direction of 45° and so that the width of each of them may be substantially equal to the width of the light beam condensed by the cylindrical minute lens $101_1$–$101_3$. On the whole of that surface of the plane parallel plate 103 which is opposite to the condensing lens 101, there is provided aluminum total reflection film 105 subjected to high reflection treatment.

Assuming that the light beam 102 incident on the condensing lens 101 is substantially parallel light, this light beam 102 is compressed into lattice-like substantially parallel light of a half width by the cylindrical minute lenses $101_1$–$101_3$ of the condensing lens 101, and is separated as follows by the polarizing separating film 104 provided on that surface of the plane parallel plate 103 which is adjacent to the condensing lens 101.

S-polarized light 102S is reflected in a direction orthogonal to the incident light, and P-polarized light 102P is transmitted. The transmitted P-polarized light 102P is reflected by the aluminum total reflection film 105 provided on that surface of the plane parallel plate 103 which is opposite to the incidence side, whereafter it passes through the half wavelength plate 106, whereby the polarization direction thereof is rotated by 90° and this light emerges as S-polarized light. The incident natural light is uniformized into S-polarized lights in this manner. Alternatively, the aluminum total reflection film 105 may not be formed and that surface of the plane parallel plate 103 which is opposite to the incidence side may be set as a total reflection surface, and P-polarized light may be reflected by this surface.

Figure 3:
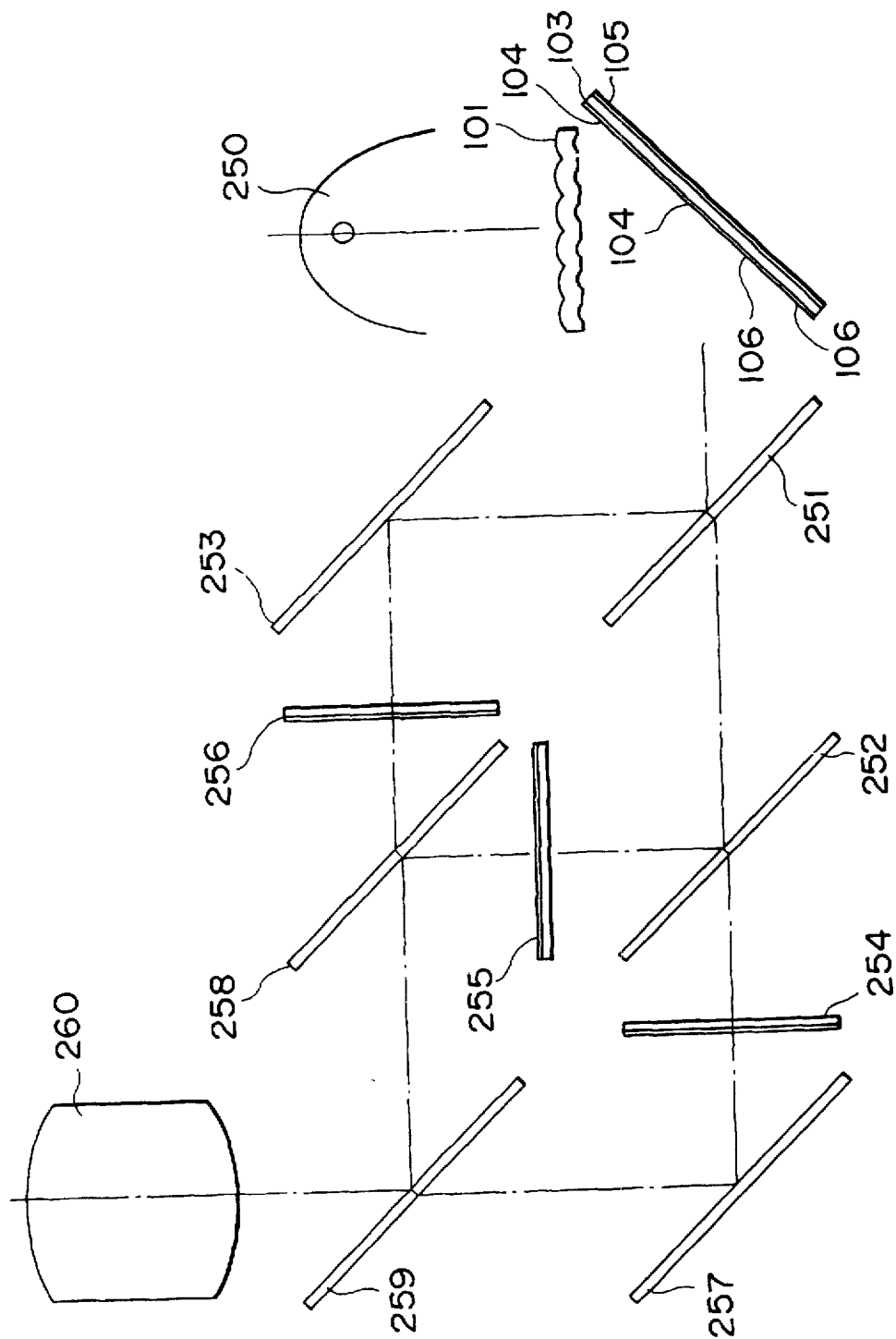
FIG. 3 shows the construction of a projector according to the first embodiment of the present invention.

FIG. 3 shows the construction of a projector which incorporates therein the polarizing element constructed as described above.

A parallel light beam having various polarization directions which is emitted from a light source 250 is converted into only S-polarized light by the polarizing element shown in FIG. 2 and emerges.

Figure 1:
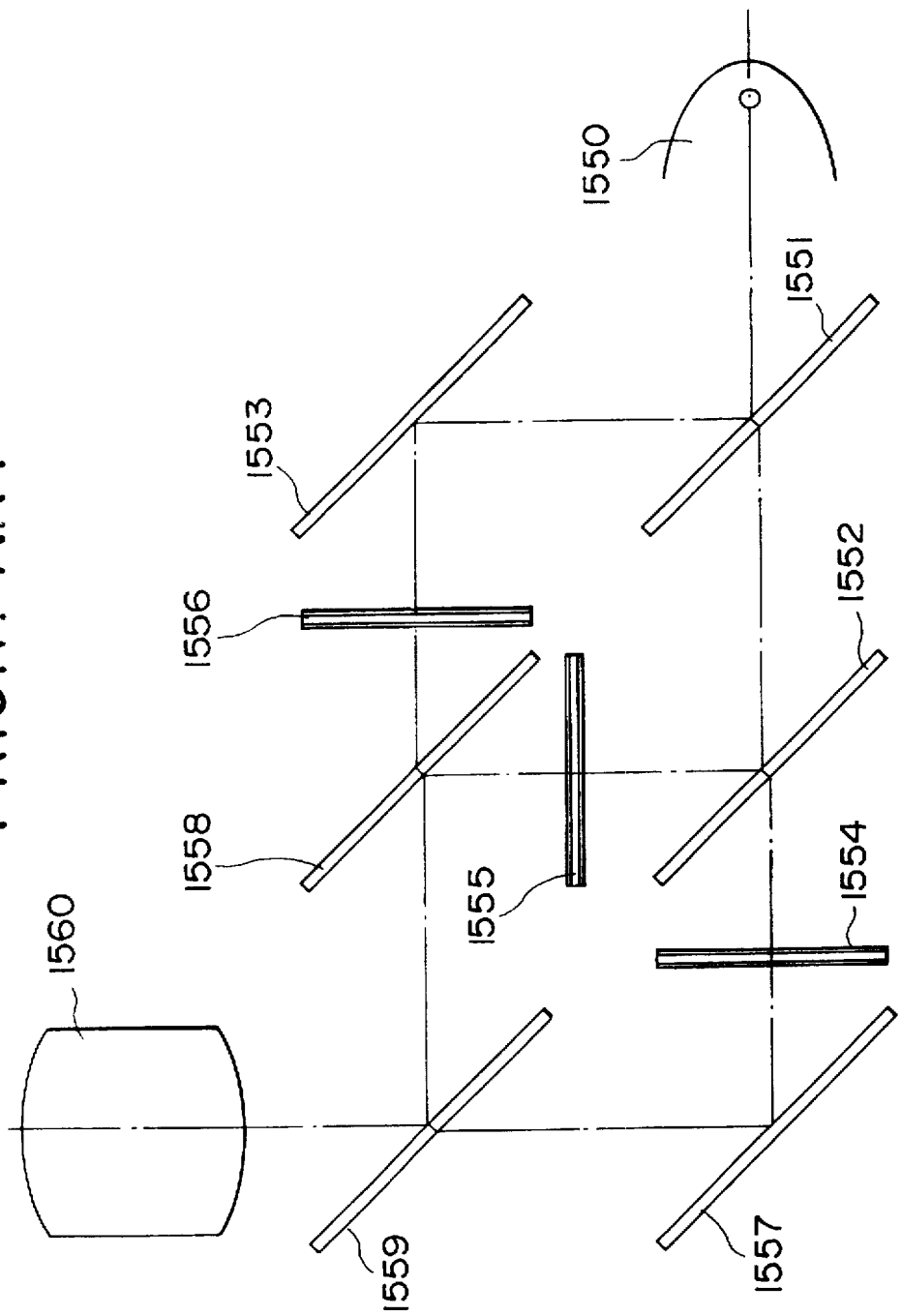
FIG. 1 shows the construction of a projector according to the prior art.

Dichroic mirrors 251, 252, 258, 259, total reflection mirrors 253, 257, liquid crystal light bulbs 254, 255, 256 and a projection lens 260 in the present embodiment are similar in construction to the dichroic mirrors 1551, 1552, 1558, 1559, the total reflection mirrors 1553, 1557, the liquid crystal light bulbs 1554, 1555, 1556 and the projection lens 1560, respectively, shown in FIG. 1.

The liquid crystal light bulbs 254, 255 and 256 each modulate the orientation of a plurality of liquid crystal elements contained therein inconformity with a video signal input thereto from an image generator (not shown) comprised of three generators for generating red, green and blue images, respectively, whereby images are generated. The dichroic mirrors 251, 252, 258 and 259 together constitute a color resolving system for resolving the illuminating light converted into only S-polarized light by the polarizing element shown in FIG. 2 into red, green and blue lights.

By the above-described construction, the loss of light in each of the liquid crystal light bulbs 254, 255 and 256 is eliminated and therefore, the projected image can be made bright and the generation of heat by the absorption of light does not occur. In this case, polarizing plates need not be provided on the incidence side of the liquid crystal light bulbs, but they may be provided to increase the purity of polarized light.

If design is made such that the incidence surface of the polarizing element is perpendicular to the plane of the drawing sheet and the light source 250 is disposed in a direction perpendicular to the plane of the drawing sheet, P-polarized light can be caused to be incident on each dichroic mirror and therefore, color resolution-combination can be accomplished efficiently.

Figure 4:
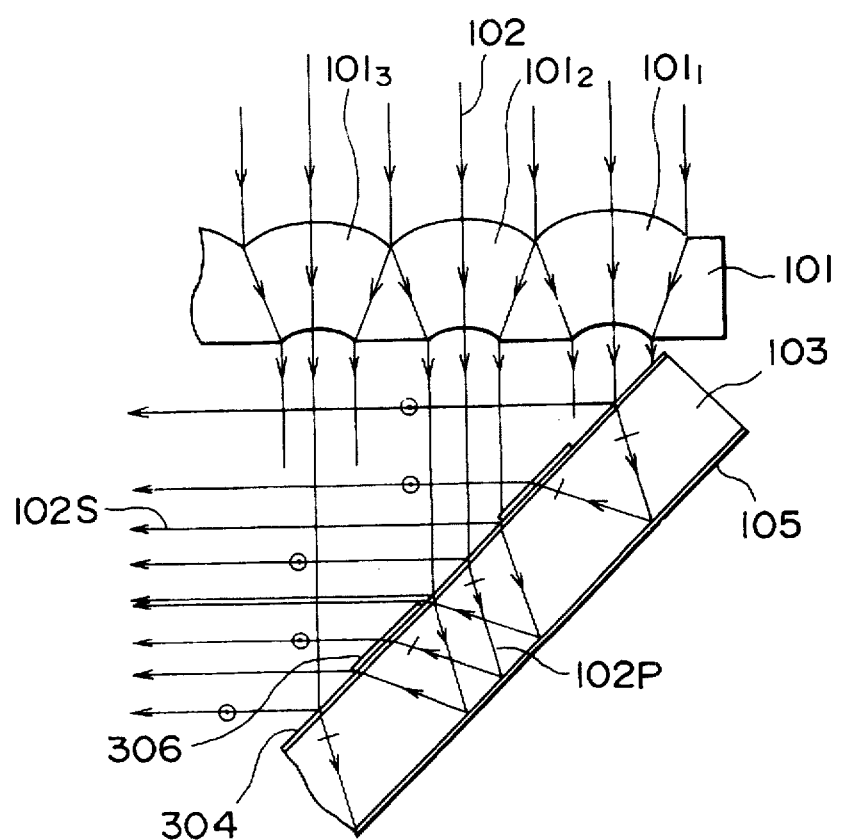
FIG. 4 shows the construction of a second embodiment of the present invention.

FIG. 4 shows the construction of a second embodiment of the present invention.

In the present embodiment, polarizing separating film 304 formed of multilayer film is provided on the whole of that surface of a plane parallel plate 103 provided at an angle of 45° with respect to the optical axis of a condensing lens 101 which is adjacent to the condensing lens, and film-like half wavelength plates 306 are provided on the polarizing separating film at the pitch of cylindrical minute lenses $101_1$–$101_3$ as viewed from the direction of 45° and so that the width each of them may be substantially equal to the width of the light beam condensed by each cylindrical minute lens. In the other points, the construction of the present embodiment is similar to that of the first embodiment shown in FIG. 2 and therefore, similar elements are given similar reference numerals and need not be described.

With the construction as described above, it is not necessary to effect masking when the polarizing separating film is deposited by evaporation and thus, the manufacturing process can be further simplified.

Figure 5:
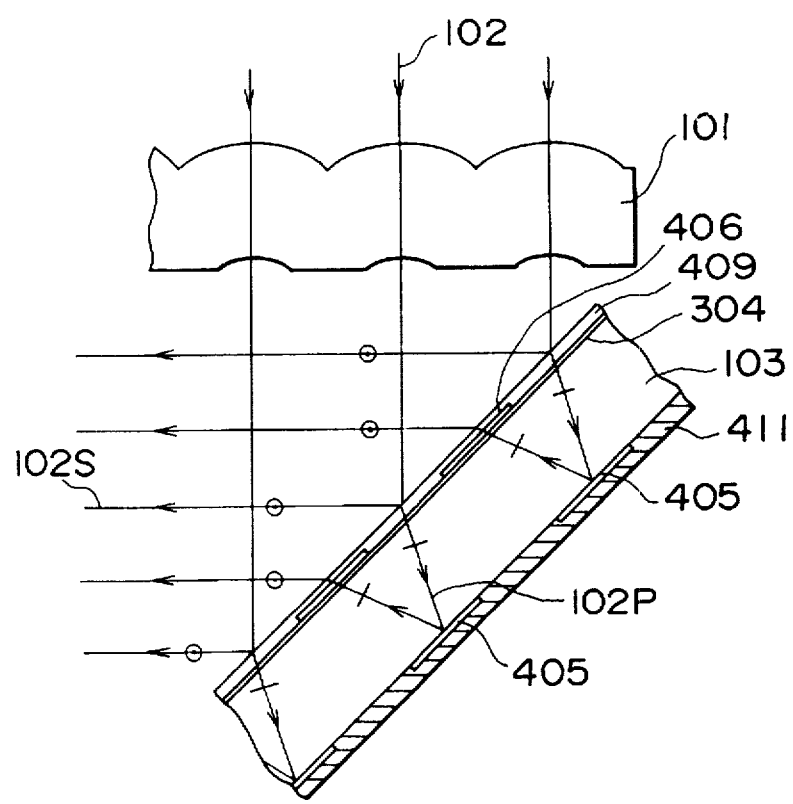
FIG. 5 shows the construction of a third embodiment of the present invention.

FIG. 5 shows the construction of a third embodiment of the present invention.

The present embodiment is such that in the second embodiment, film-like half wavelength plate 406 directly formed on the polarizing separating film 304 is formed on a holding plane parallel plate 409 and this holding plane parallel plate 409 is joined to the plane parallel plate 103 through the polarizing separating film 304. Also, the aluminum total reflection films 405 provided on the whole of that surface which is opposite to the condensing lens 101 are provided as aluminum total reflection films 405 provided at substantially the pitch of the cylindrical minute lenses $101_1$–$101_3$ as viewed from the direction of 45° and with the width of each of them substantially equal to the width of the light beam condensed by each cylindrical minute lens so that stray light may not be reflected in the direction of emergence of regular light, and further, absorbent paint 411 covering the whole of that surface of the plane parallel plate 103 which is opposite to the condensing lens 101 is provided to thereby achieve the effect of cutting stray light. Also, a half wavelength plate 406 may be formed in a lattice-like pattern on the plane parallel plate 103 and polarizing separating film 304 may be formed in a lattice-like pattern on the holding plane parallel plate 409 so that their phases may be inverted with respect to each other, and they may be joined together. Also, both of the half wavelength plate 406 and the polarizing separating film 304 may be formed on the holding plane parallel plate 409, and the plane parallel plate 103 and the holding plane parallel plate 409 may be cemented together.

Figure 6:
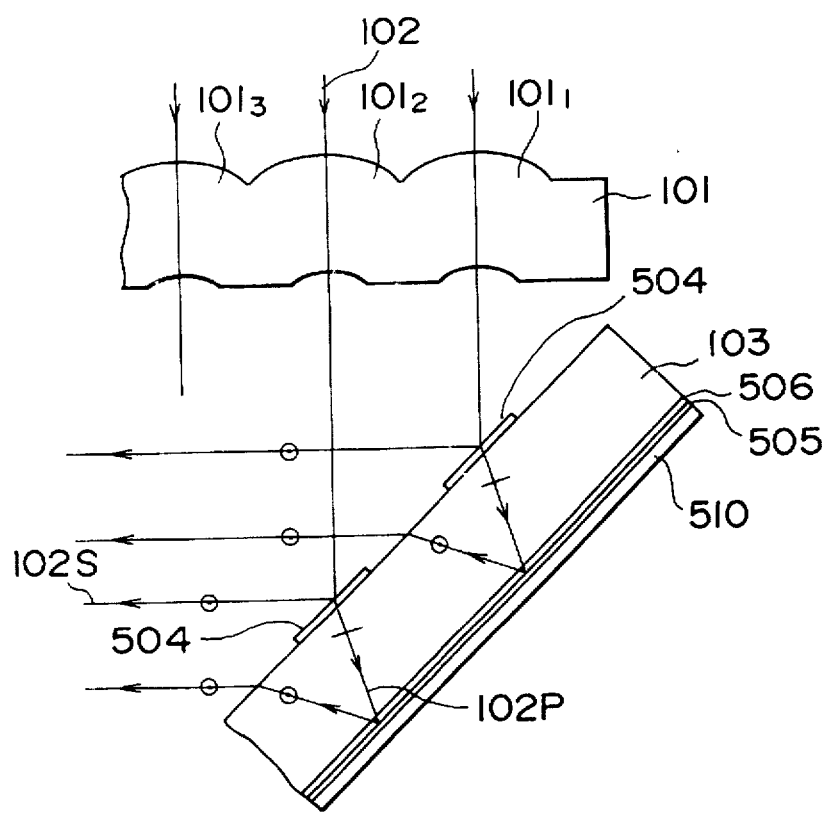
FIG. 6 shows the construction of a fourth embodiment of the present invention.

FIG. 6 shows the construction of a fourth embodiment of the present invention.

The present embodiment is one in which polarizing rotational means is provided on the whole surface of the plane parallel plate 103. In the present embodiment, on that surface of the plane parallel plate 103 provided at an angle of 45° with respect to the optical axis of the condensing lens 101 which is adjacent to the condensing lens 101, polarizing separating films 504 formed of multilayer films are provided at the pitch of the cylindrical minute lenses $101_1$–$101_3$ as viewed from the direction of 45° and with substantially the same width as the width of the light beam condensed by each cylindrical minute lens. On the other hand, on the whole of that surface of the plane parallel plate 103 which is opposite to the condensing lens 101, a film-like quarter wavelength plate 506 is provided and further, a holding plane parallel plate 510 having aluminum total reflection film 505 deposited by evaporation on the whole surface thereof is provided so that the aluminum total reflection film 505 and the quarter wavelength plate 506 may be opposed to each other.

With the construction as described above, the film-like quarter wavelength plate 506 can be attached to the whole of that surface of the plane parallel plate 103 which is opposite to the condensing lens 101 and therefore, the manufacturing process can be simplified.

Assuming that the light beam 102 entering the polarizing conversion element is a substantially parallel light beam, the width of the light beam is compressed by the cylindrical minute lenses $101_1$–$101_3$ constituting the condensing lens 101, and S-polarized light 102S is reflected by the polarizing separating film 504 provided on that surface of the plane parallel plate 103 which is adjacent to the condensing lens 101 and P-polarized light 102P is transmitted through the polarizing separating film 504. The transmitted P-polarized light 102P passes through the quarter wavelength plate 506 provided on that surface of the plane parallel plate 103 which is opposite to the condensing lens 101, whereby it becomes circularly polarized light and is reflected by the aluminum total reflection film 505, whereafter it passes through the quarter wavelength plate 506 again, whereby it becomes S-polarized light whose polarizing direction has been rotated by 90° and emerges from among the polarizing separating films 504.

The incident natural light can be uniformized into S-polarized light in the manner described above.

Figure 7:
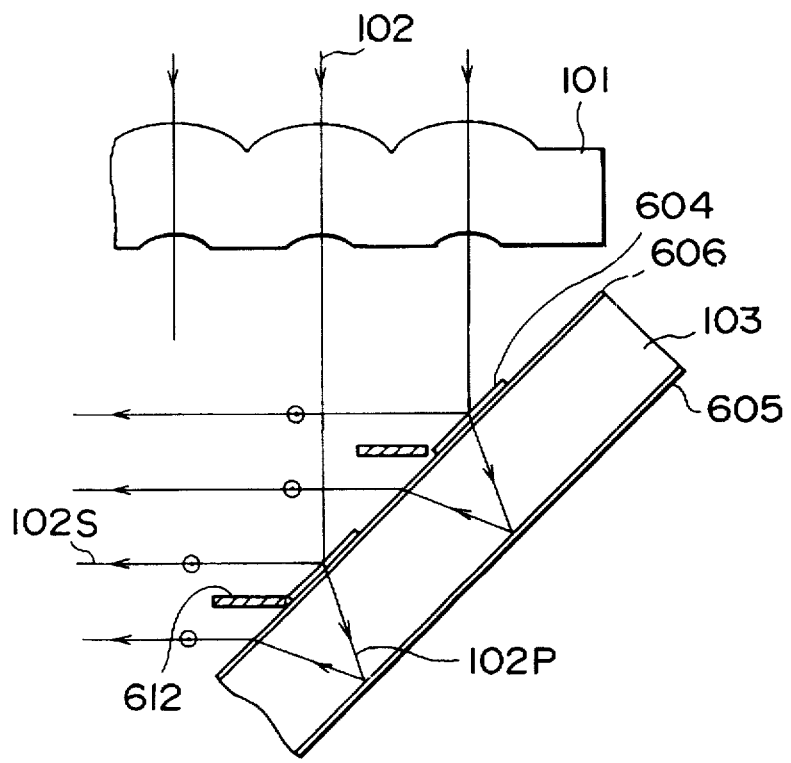
FIG. 7 shows the construction of a fifth embodiment of the present invention.

FIG. 7 shows a fifth embodiment of the present invention.

The present embodiment, like the fourth embodiment shown in FIG. 6, is one in which polarizing rotational means is provided on the whole surface of the plane parallel plate 103.

In the present embodiment, a film-like quarter wavelength plate 606 is provided on the whole of that surface of the plane parallel plate 103 provided at an angle of 45° with respect to the optical axis of the condensing lens 101 which is adjacent to the condensing lens 101. On the quarter wavelength plate 606, polarizing separating films 604 are provided at the pitch of the cylindrical minute lenses $101_1$–$101_3$ as viewed from the direction of 45° and with substantially the same width as the width of the light beam condensed by each cylindrical minute lens, and on the other hand, aluminum total reflection film 605 is deposited by evaporation on that surface of the plane parallel plate 103 which is opposite to the condensing lens 101.

As described above, the film-like quarter wavelength plate 606 is attached to the whole of that surface of the plane parallel plate 103 which is adjacent to the condensing lens 101, whereby the manufacturing process can be simplified.

The light beam 102 entering the polarizing element has its beam width compressed by the cylindrical minute lenses $101_1$–$101_3$ constituting the condensing lens 101, and S-polarized light 102S is reflected in a direction orthogonal to the incident light by the polarizing separating films 604 provided on that surface of the plane parallel plate 103 which is adjacent to the condensing lens 101, and P-polarized light 102P is transmitted through the polarizing separating films 604. The transmitted P-polarized light 102P passes through the quarter wavelength plate 606, whereby it becomes circularly polarized light and is reflected by the aluminum total reflection film 605 provided on that surface of the plane parallel plate 103 which is opposite to the condensing lens 101, whereafter it passes through the quarter wavelength plate 606 again, whereby it becomes S-polarized light whose polarization direction has been rotated by 90° and emerges from among the polarizing separating films 604.

The incident natural light can be uniformized into S-polarized light in the manner described above.

In the present embodiment, in order that the illuminating light which has deviated from the parallel light may not become stray light, a light intercepting plate 612 which intercepts the illuminating light which has deviated from the parallel light and passes the emergent light therethrough is provided on that portion of the plane parallel plate 103 which is adjacent to the condensing lens 101 substantially in parallelism to the emergent light to thereby improve the purity of the polarization of the emergent light.

Figure 8:
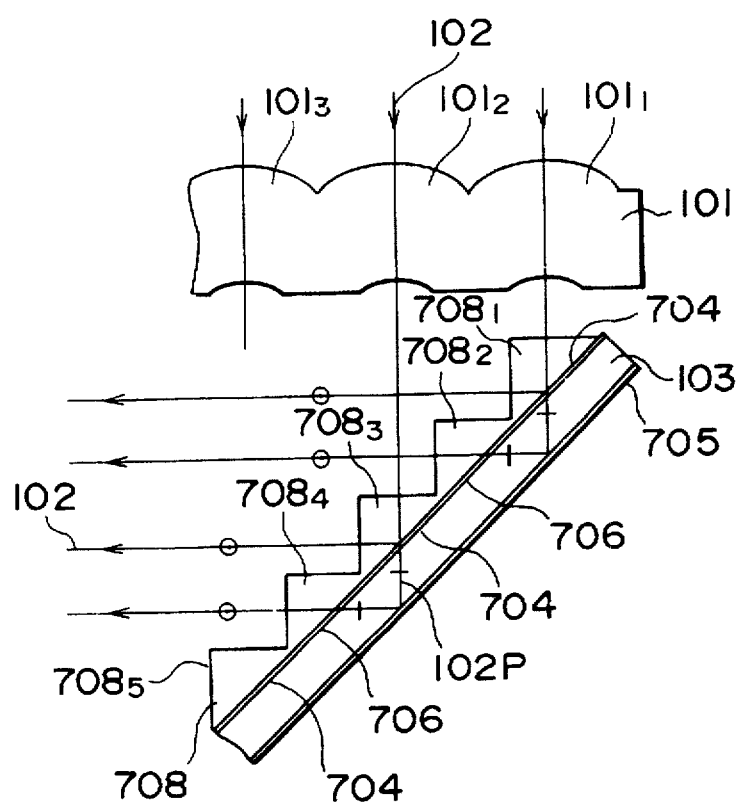
FIG. 8 shows the construction of a sixth embodiment of the present invention.

FIG. 8 shows the construction of a sixth embodiment of the present invention.

The present embodiment is one in which minute prisms are combined with a plane parallel plate.

On that surface of the plane parallel plate 103 provided at an angle of 45° with respect to the optical axis of the condensing lens 101 which is adjacent to the condensing lens 101, pairs of polarizing separating films 704 formed by multilayer film and half wavelength plates 706 are provided at the pitch of the cylindrical minute lenses $101_1$–$101_3$ as viewed from the direction of 45° and with substantially the same width as the width of the light beam condensed by each cylindrical minute lens, and aluminum total reflection film 705 is provided on the whole of that surface of the plane parallel plate 103 which is opposite to the condensing lens 101. Further, on that surface of the plane parallel plate 103 which is adjacent to the condensing lens 101, a prism plate 708 comprising minute prisms $708_1$–$708_5$ each having a flat surface substantially perpendicular to the optical axis of the condensing lens 101 and a flat surface substantially perpendicular to the emergent light is provided in contact with the plane parallel plate 103.

Assuming that the light beam 102 entering the polarizing element is a substantially parallel light beam, the width of the light beam is compressed by the cylindrical minute lenses $101_1$–$101_3$ constituting the condensing lens 101, and the light beam enters the minute prisms $708_1$–$708_5$ constituting the prism plate 708 and is separated into S-polarized light 102S and P-polarized light 102P by the polarizing separating film 704 provided on that surface of the plane parallel plate 103 which is adjacent to the condensing lens 101. The S-polarized light 102S is reflected in a direction orthogonal to the incident light 102 and emerges through the minute prisms $708_1$, $708_3$ and $708_5$ constituting the prism plate 708. The P-polarized light 102P is transmitted through the polarizing separating films 704, is reflected by the aluminum total reflection film 705 provided on that surface of the plane parallel plate 103 which is opposite to the condensing lens 101, and passes through the half wavelength plates 706, whereby it becomes S-polarized light whose polarization direction has been rotated by 90°, and emerges through the minute prisms $708_2$ and $708_4$ constituting the prism plate 708.

The incident natural light can be uniformized into S-polarized light in the manner described above.

If as in the present embodiment, the polarizing separating films are provided in the optical medium, the extinction ratio can be enhanced over a wide band.

Figure 9:
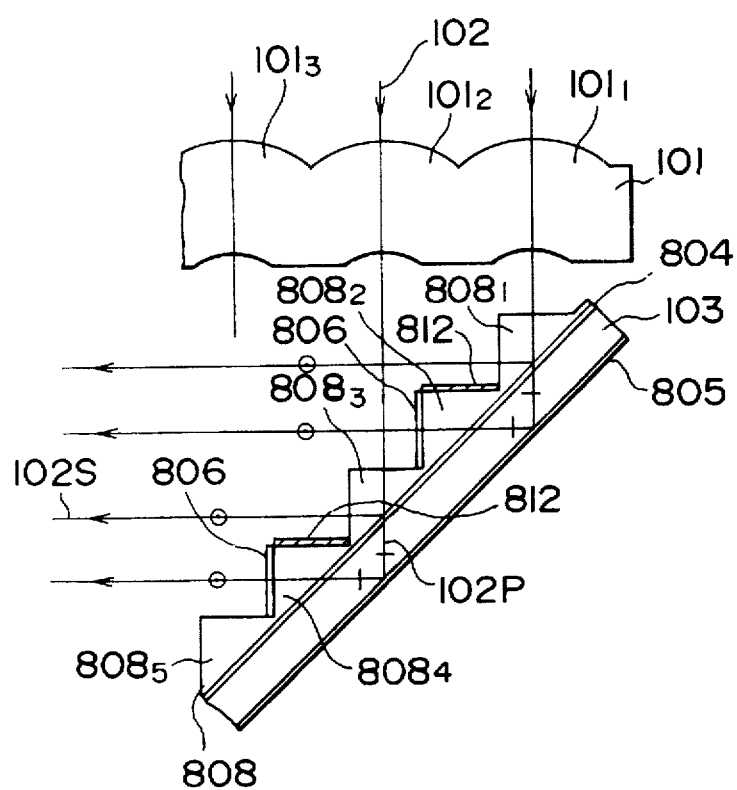
FIG. 9 shows the construction of a seventh embodiment of the present invention.

FIG. 9 shows the construction of a seventh embodiment of the present invention.

The present embodiment, like the sixth embodiment shown in FIG. 8, is one in which minute prisms are combined with a plane parallel plate.

Polarizing separating film 804 formed of multilayer film is provided on the whole of that surface of the plane parallel plate 103 provided at an angle of 45° with respect to the optical axis of the condensing lens 101 which is adjacent to the condensing lens 101, and aluminum total reflection film 805 is provided on the whole of that surface of the plane parallel plate 103 which is opposite to the condensing lens 101. Further, on that surface of the plane parallel plate 103 which is adjacent to the condensing lens 101, a prism plate 808 comprising minute prisms $808_1$–$808_5$ each having a flat surface substantially perpendicular to the optical axis of the condensing lens 101 and a flat surface substantially perpendicular to the emergent light is provided in contact with the plane parallel plate 103.

A film-like half wavelength plate 806 is provided on each of the exit portions of those $808_2$ and $808_4$ of the minute prisms $808_1$–$808_5$ constituting the prism plate 808 which are located among the cylindrical minute lenses, and light intercepting members 812 are provided on the surfaces perpendicular to the exit portions.

By the construction as described above, as in the sixth embodiment shown in FIG. 8, the incident natural light can be uniformized into S-polarized light and further, by the provision of the light intercepting members 812, stray light can be eliminated and the extinction ratio can be made high.

Figure 10:
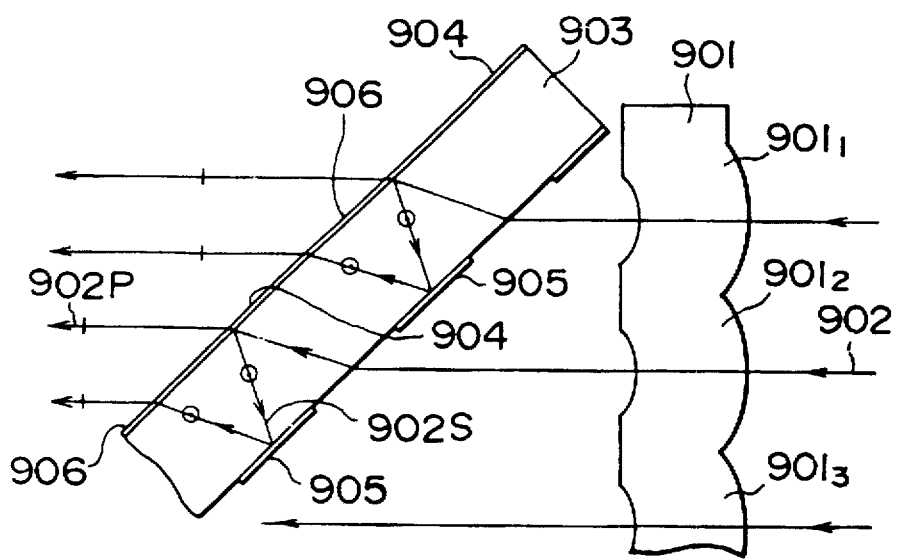
FIG. 10 shows the construction of an eighth embodiment of the present invention.

FIG. 10 shows the construction of an eighth embodiment of the present invention which is applied to a transmission type polarizing element.

The polarizing element of the present embodiment is comprised of a condensing lens 901 which is a resin molded article comprised of cylindrical minute lenses $901_1$–$901_3$ having the function of an afocal converter, and a plane parallel plate 903 disposed so that the planar portion thereof may have an angle of 45° with respect to the optical axis of the condensing lens 901. On that surface of the plane parallel plate 903 which is opposite to the condensing lens 901, pairs of polarizing separating films 904 formed of multilayer film and film-like half wavelength plates 906 are provided at the pitch of the cylindrical minute lenses $901_1$–$901_3$ as viewed from the direction of 45° and with substantially the same width as the width of the light beam condensed by each cylindrical minute lens, and on that surface of the plane parallel plate 903 which is adjacent to the condensing lens 901, aluminum total reflection films 905 are provided at the pitch of the cylindrical minute lenses $901_1$–$901_3$ as viewed from the direction of 45° and so that the width of each of them may be substantially the same as the width of the light beam condensed by each cylindrical minute lens.

Assuming that the light beam 902 entering the polarizing element is a substantially parallel light beam, the light beam 902 has its beam width compressed by the cylindrical minute lenses $901_1$–$901_3$ constituting the condensing lens 901, and passes through among the aluminum total reflection films 905 provided on that surface of the plane parallel plate 903 which is adjacent to the condensing lens 901, and enters the polarizing separating films 904 provided on that surface of the plane parallel plate 903 which is opposite to the condensing lens 901. The light beam 902 which has entered the polarizing separating films 904 is separated into P-polarized light 902P and S-polarized light 902S. The P-polarized light 902P is transmitted through the polarizing separating films 904 and emerges therefrom. On the other hand, the S-polarized light 902S is reflected, and is further reflected by the aluminum total reflection films 905 provided on that surface of the plane parallel plate 903 which is adjacent to the condensing lens 901, and emerges through the half wavelength plates 906 provided on that surface of the plane parallel plate 903 which is opposite to the condensing lens 901. By passing through the half wavelength plates 906, the S-polarized light has its polarization direction rotated by 90° and emerges as P-polarized light.

The incident natural light can be uniformized into P-polarized in the manner described above.

Figure 11:
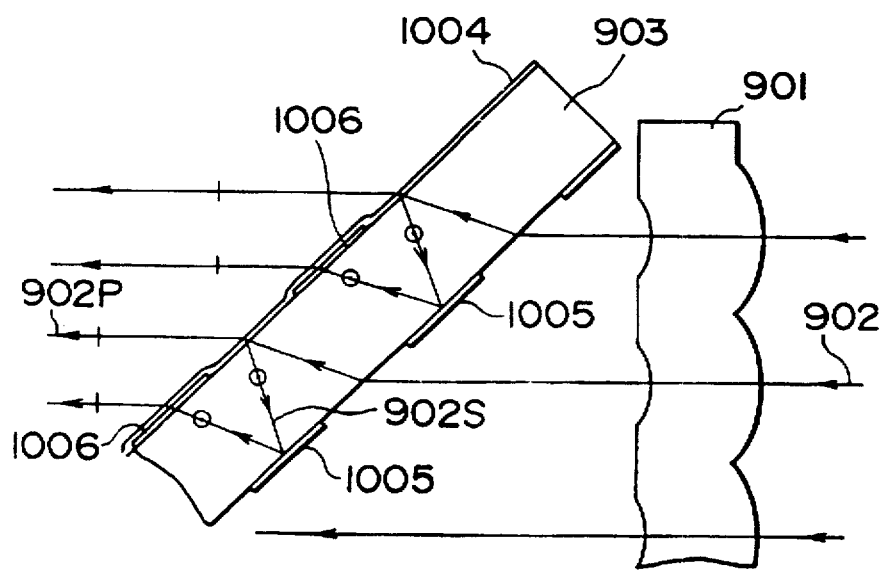
FIG. 11 shows the construction of a ninth embodiment of the present invention.

FIG. 11 shows the construction of a ninth embodiment of the present invention which, like the eighth embodiment shown in FIG. 10, is applied to a transmission type polarizing element.

In the present embodiment, on that surface of the plane parallel plate 903 which is opposite to the condensing lens 901, film-like half wavelength plates 1006 are provided at the pitch of the cylindrical minute lenses $901_1$–$901_3$ as viewed from the direction of 45° and so that the width of each of them may be substantially the same as the width of the light beam condensed by each cylindrical minute lens, and polarizing separating film 1004 formed of multilayer film is provided fully thereon. On the other hand, on that surface of the plane parallel plate 903 which is adjacent to the condensing lens 901, aluminum (or silver) total reflection films 1005 are provided at the pitch of the cylindrical minute lenses $901_1$–$901_3$ as viewed from the direction of 45° and so that the width of each of them may be substantially the same as the width of the light beam condensed by each cylindrical lens. In the other points, the construction of the present embodiment is similar to that of the eighth embodiment shown in FIG. 10 and therefore, similar elements are given similar reference numerals and need not be described.

By the construction as described above, the incident natural light can be uniformized into P-polarized light as in the eighth embodiment shown in FIG. 10. Also, in the present embodiment, the polarizing separating film is provided on the whole surface and therefore, it is not necessary to effect masking when it is formed and thus, the manufacturing process can be simplified.

Figure 12:
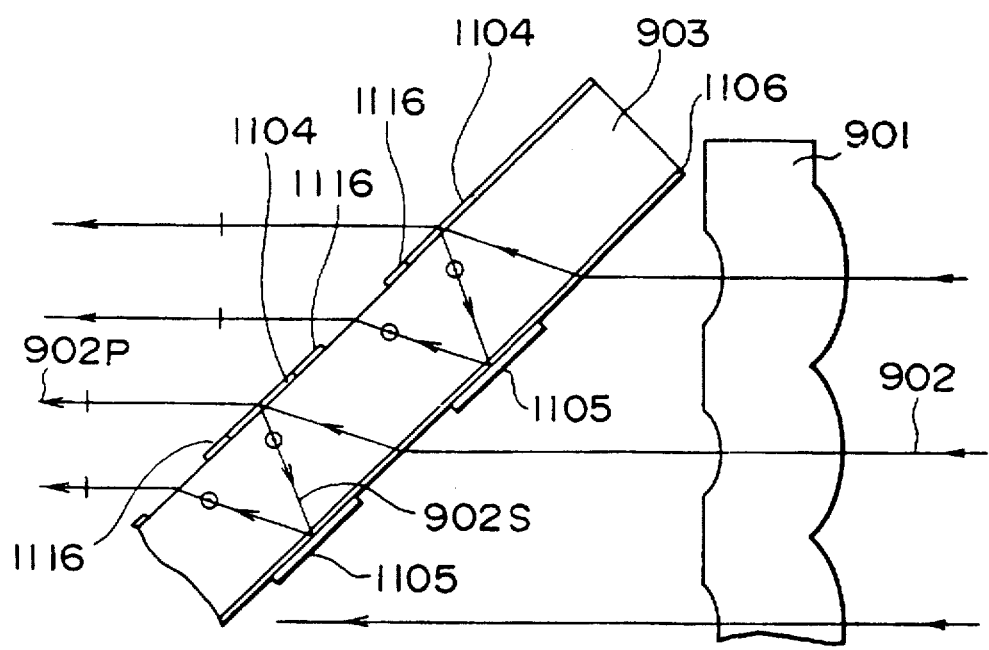
FIG. 12 shows the construction of a tenth embodiment of the present invention.

FIG. 12 shows the construction of a tenth embodiment of the present invention which, like the eighth and ninth embodiments shown in FIGS. 10 and 11, is applied to a transmission type polarizing element.

In the present embodiment, on that surface of the plane parallel plate 903 which is opposite to the condensing lens 901, polarizing separating films 1104 are provided at the pitch of the cylindrical minute lenses $901_1$–$901_3$ as viewed from the direction of 45° and so that the width of each of them may be substantially the same as the width of the light beam condensed by each cylindrical minute lens, and on the other hand, on that surface of the plane parallel plate 903 which is adjacent to the condensing lens 901, a film-like quarter wavelength plate 1106 is provided, and further on the quarter wavelength plate 1106, aluminum (or silver) total reflection films 1105 are provided at the pitch of the cylindrical minute lenses $901_1$–$901_3$ as viewed from the direction of 45° and so that the width of each of them may be substantially the same as the width of the light beam condensed by each cylindrical minute lens. Also, absorbing members 1116 for absorbing and eliminating any unnecessary light are provided on both sides of each polarizing separating film 1104 on that surface of the plane parallel plate which is opposite to the condensing lens 901. In the other points, the construction of the present embodiment is similar to the construction of the eighth and ninth embodiments shown in FIGS. 10 and 11 and therefore, similar elements are given similar reference numerals and need not be described.

Figure 13:
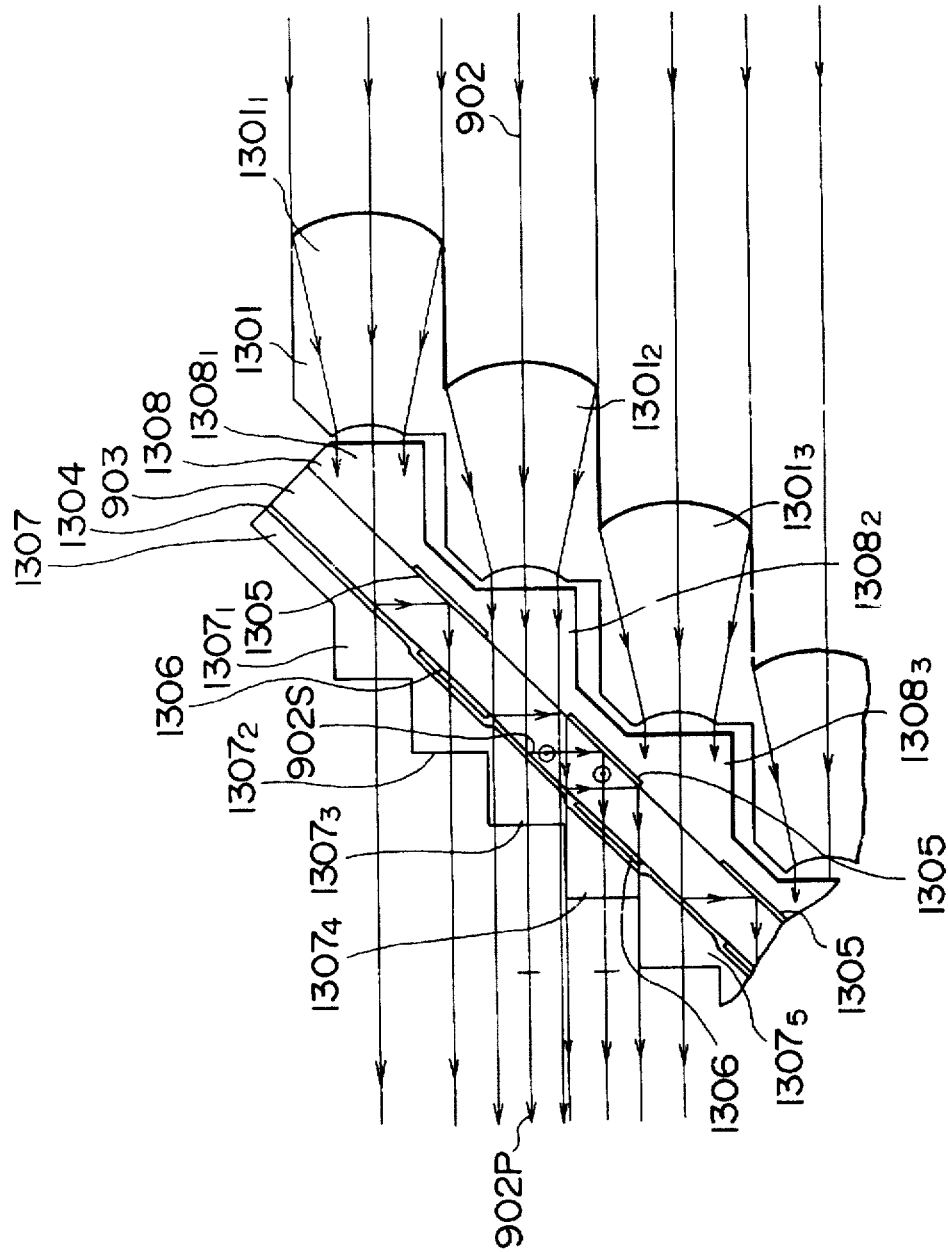
FIG. 13 shows the construction of an eleventh embodiment of the present invention.

FIG. 13 shows the construction of an eleventh embodiment of the present invention.

In the present embodiment, a condensing lens 1301 is comprised of cylindrical minute lenses $1301_1$–$1301_3$, and the plane parallel plate 903 is provided at an angle of 45° with respect to the optical axis of the condensing lens 1301. Half wavelength plates 1306 are provided at predetermined locations on that surface of the plane parallel plate 903 which is opposite to the condensing lens 1301, and polarizing separating film 1304 formed of multilayer film is further provided on the whole of said surface. Aluminum total reflection films 1305 subjected to high reflection treatment are provided on that surface of the plane parallel plate 903 which is adjacent to the condensing lens 1301. The half wavelength plates 1306 and the aluminum total reflection films 1305 are provided at the pitch of the cylindrical minute lenses $1301_1$–$1301_3$ as viewed from the direction of 45° and so that the width of each of them may be substantially the same as the width of the light beam condensed by each cylindrical minute lens. An emergence side prism plate 1307 and an incidence side prism plate 1308 covering the whole surface of the plane parallel plate 903 are provided on top of the polarizing separating film 1304 and aluminum total reflection films 1305, respectively. The emergence side prism plate 1307 is comprised of minute prisms $1307_1$–$1307_5$, and the incidence side prism plate 1308 is comprised of minute prisms $1308_1$–$1308_3$. Each of these minute prisms $1307_1$–$1307_5$ and $1308_1$–$1308_3$ has a flat surface parallel to a flat surface (exit portion) perpendicular to the optical axis of the condensing lens 1301, and two of the minute prisms constituting the emergence side prism plate 1307 are provided for each cylindrical minute lens, and one of the minute prisms constituting the incidence side prism plate 1308 is provided for each cylindrical minute lens. The cylindrical minute lenses $1301_1$–$1301_3$ constituting the condensing lens 1301 are disposed with level differences to prevent any light deviating from the parallel light beam from becoming lost light, and are constructed so as to be proximate to the corresponding minute prisms $1308_1$–$1308_3$.

Assuming that the light beam 902 entering the polarizing element constructed as described above is a parallel light beam, the light beam 902 is compressed to a half width by the cylindrical minute lenses $1301_1$–$1301_3$ constituting the condensing lens 1301, enters the minute prisms $1308_1$–$1308_3$ constituting the incidence side prism plate 1308, and passes through the gaps among the aluminum total reflection films 1305 provided on that surface of the plane parallel plate 903 which is adjacent to the condensing lens 1301, whereafter it is separated into P-polarized light 902P and S-polarized light 902S by the polarizing separating film 1304 provided on that surface of the plane parallel plate 903 which is opposite to the condensing lens 1301. The P-polarized light 902P is transmitted through the polarizing separating film 1304 and emerges through the minute prisms $1307_1$ and $1307_3$ constituting the emergence side prism plate 1307. On the other hand, the S-polarized light 902S is reflected in a direction orthogonal to the incident light, and is reflected by the aluminum total reflection films 1305 provided on that surface of the plane parallel plate 903 which is adjacent to the condensing lens 1301, whereafter it emerges through the half wavelength plates 1306, the polarizing separating film 1304 and the minute prisms $1307_2$ and $1307_4$ constituting the emergence side prism plate 1307. The S-polarized light, when it passes through the half wavelength plates 1306, has its polarization direction rotated by 90° and becomes P-polarized light, and because it further passes through the polarizing separating film 1304, all the emergent light becomes P-polarized light of high purity.

The incident natural light can be uniformized into P-polarized light in the manner described above.

By adopting a construction like that of the present embodiment wherein the polarizing separating film in the optical medium, the extinction ratio can be made high over a wide band.

Figure 14:
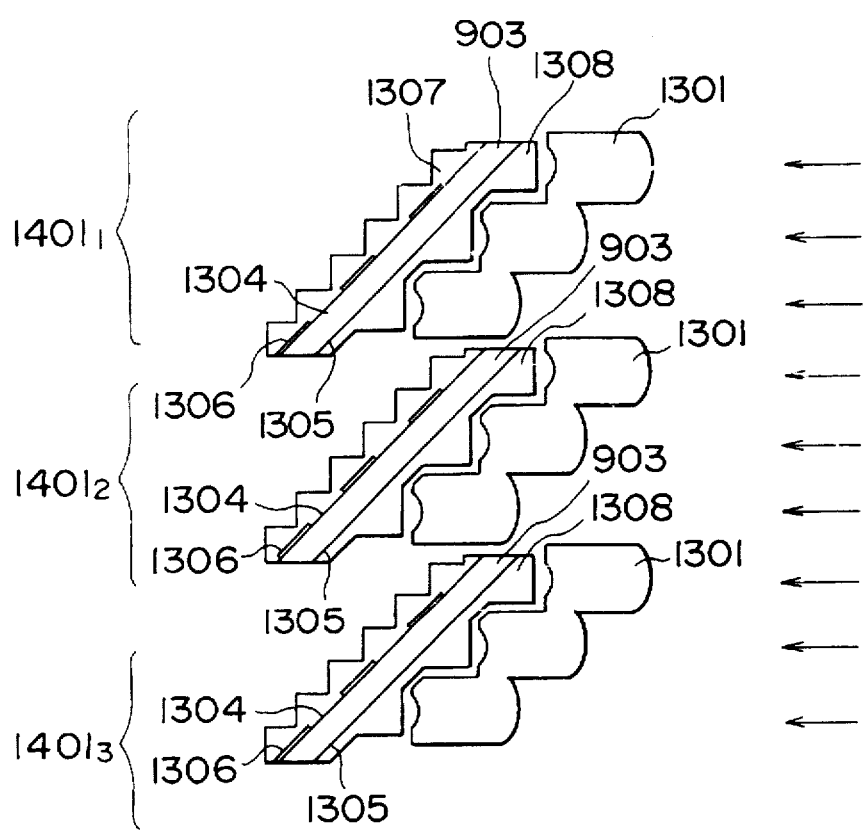
FIG. 14 shows the construction of a twelfth embodiment of the present invention.

FIG. 14 shows the construction of a twelfth embodiment of the present invention.

The present embodiment is one in which use is made of conversion units $1401_1$–$1401_3$ similar in construction to the embodiment shown in FIG. 13 and the end portions of these units are uniformized and installed parallel to one another to thereby save the space.

By adopting such a construction, the volume occupied by the polarizing conversion element, particularly the dimensions of the condensing lens in the direction of the optical axis thereof, can be made small. For example, by the polarizing conversion element being divided, into three units as shown, the dimensions of the condensing lens in the direction of the optical axis thereof can be reduced to about ⅓, and this can contribute to the compactness of the projector constructed by the use of it.

Figure 15:
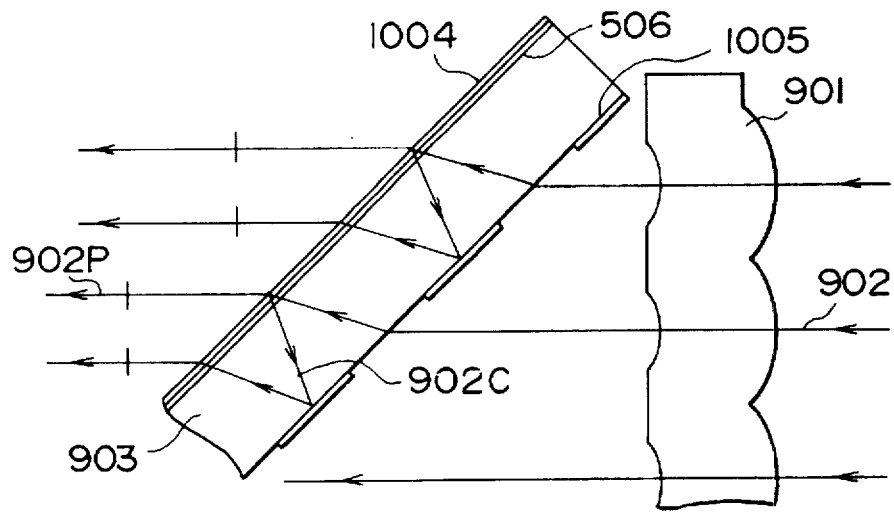
FIG. 15 shows the construction of a thirteenth embodiment of the present invention.

FIG. 15 shows a thirteenth embodiment of the present invention.

The difference of this embodiment from the embodiment of FIG. 11 is that in the embodiment of FIG. 11, the half wavelength plates are intermittently provided, whereas in the present embodiment, a quarter wavelength plate is provided on substantially the whole of that surface of the plane parallel plate 903 which is opposite to the condensing lens 901. In the other points, the present embodiment is similar to the embodiment of FIG. 1.

Of the light beam 902 having had its beam width compressed by the condensing lens 901, P-polarized light 902P is transmitted through polarizing separating film 1004 provided on that surface of the plane parallel plate 903 which is opposite to the condensing lens 901 and S-polarized light is reflected by the polarizing separating film 1004. The S-polarized light passes through a quarter wavelength plate 506 provided on that surface of the plane parallel plate 903 which is opposite to the condensing lens 901, whereby it becomes circularly polarized light 902C. The circularly polarized light 902C is reflected by aluminum total reflection films 1005, whereafter it passes through the quarter wavelength plate 506 again and thereby becomes P-polarized light whose polarization direction has been rotated by 90°, and passes through polarizing separating film 1004.

The incident natural light can be uniformized into P-polarized light in the manner described above.

Figure 16:
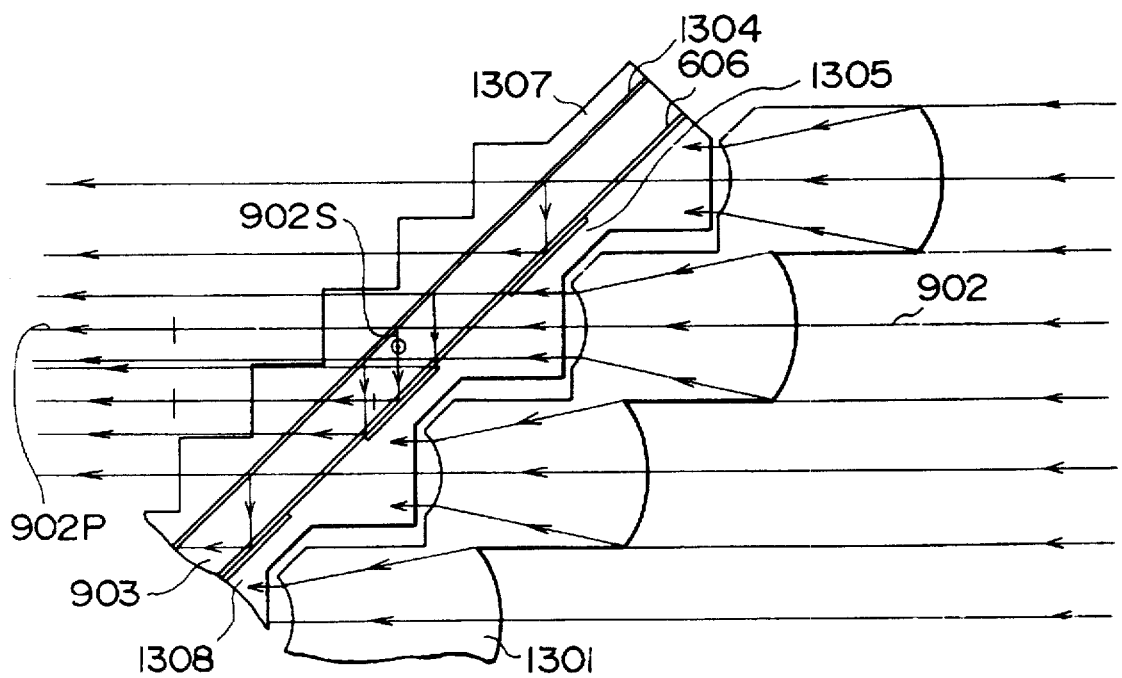
FIG. 16 shows the construction of a fourteenth embodiment of the present invention.

FIG. 16 shows a fourteenth embodiment of the present invention.

The difference of this embodiment from the embodiment of FIG. 13 is that in the embodiment of FIG. 13, the half wavelength plates are intermittently provided, whereas in this embodiment, a quarter wavelength plate is provided on substantially the whole of that surface of the plane parallel plate 903 which is adjacent to the condensing lens 1301. In the other points, the present embodiment is similar to the embodiment of FIG. 13.

Of the light beam 902 having had its beam width compressed by the condensing lens 1301, P-polarized light 902P is transmitted through polarizing separating film 1304 provided on that surface of the plane parallel plate 903 which is opposite to the condensing lens 1301 and S-polarized light 902S is reflected by the polarizing separating film 1304. The S-polarized light 902S passes through a quarter wavelength plate 606 provided on that surface of the plane parallel plate 903 which is adjacent to the condensing lens 1301, whereby it becomes circularly polarized light. The circularly polarized light is reflected by aluminum total reflection films 1305, whereafter it passes through the quarter wavelength plate 606 again, whereby it becomes P-polarized light whose polarization direction has been rotated by 90°, and passes through the polarizing separating film 1304.

The incident natural light can be uniformized into P-polarized light in the manner described above.

In the embodiments of the FIGS. 15 and 16, the polarizing separating film and the quarter wavelength plate are provided on substantially the whole surface of the plane parallel plate and therefore, masking is not necessary when they are formed and thus, the manufacturing process can be simplified. Also, as compared with the aluminum reflection film, the polarizing separating film and the wavelength plate are great in the deterioration of performance in their end portions and therefore, the construction in which the polarizing separating film and the wavelength plate need not be intermittently provided is more preferable from the viewpoint of maintaining the performance of the polarizing element.

Figure 17:
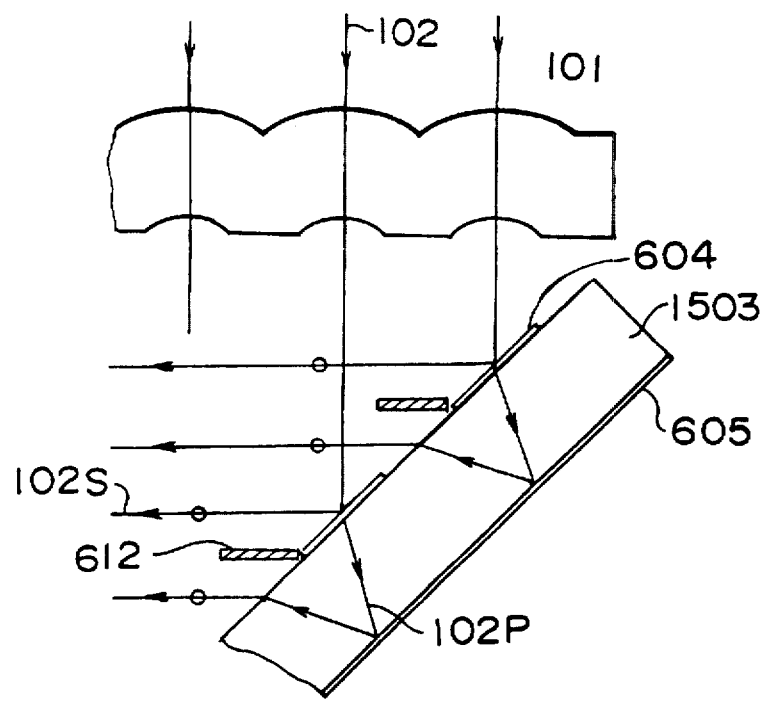
FIG. 17 shows the construction of a fifteenth embodiment of the present invention.

In the above-described embodiments, a half wavelength plate or a quarter wavelength plate has been described as being used as polarizing rotational means, but besides these, use may be made of resin film, an optically active substance such as a liquid crystal plate, or a polarization plane rotating device such as a Faraday cell to rotate the polarization direction. For example, FIG. 17 shows a fifteenth embodiment of the present invention in which plane parallel plate 1503 includes an optically active substance, thereby forming an optically active substrate. The light beam 102 entering the polarizing element has its beam width compressed by the cylindrical minute lenses constituting the condensing lens 101, and S-polarized light 102S is reflected in a direction orthogonal to the incident light by the polarizing separating films 604 provided on that surface on the plane parallel plate 1503 which is adjacent to the condensing lens 101, and P-polarized light 102P is transmitted through the polarizing separating films 604. The transmitted P-polarized light 102P passes through the plane parallel plate 1503 (i.e., optically active substrate) and is reflected by the aluminum total reflection film 605 provided on that surface of the plane parallel plate 1503 which is opposite to the condensing lens 101, whereafter it passes through the plane parallel plate 1503 again, whereby it becomes S-polarized light whose polarization direction has been rotated by 90° due to traversal of the plane parallel plate 1503 (i.e., optically active substrate), and emerges from the polarizing separating films 604.

Figure 18:
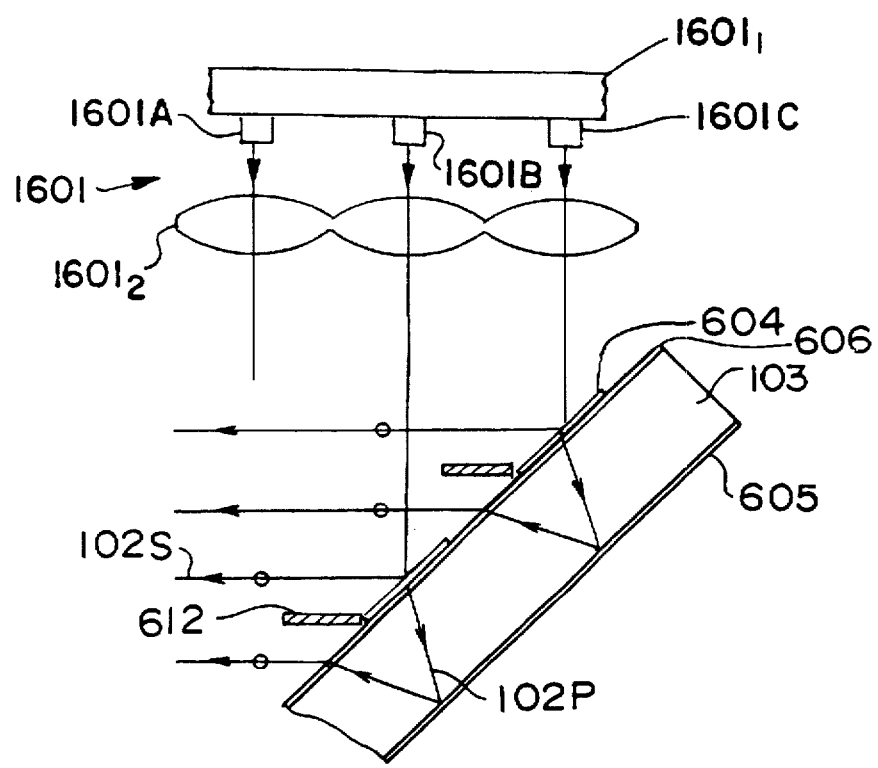
FIG. 18 shows a construction of a sixteenth embodiment of the present invention.

Also, in the above described embodiments, The illuminating system has been described as a condensing lens comprised of cylindrical minute lenses, but the illuminating system may be one provided with a light source portion comprising a number of light emitting elements arranged side by side, and a fly-eye lens for averaging the light emitted by the light source portion or dividing said light into a plurality of lights. For example, FIG. 18 shows a sixteenth embodiment of the present invention, in which the illuminating system 1601 includes LED array 1601₁, and fly-eye lens 1061₂. The LED array 1601₁, includes a plurality of LEDs 1601_A, 1601_B, 1061_C, spaced in coordination with the geometry of the fly-eye lens 1601₂.

FIG. 19 illustrates a projector constructed according to a polarizing conversion unit 1904 according to the above embodiments of the present invention, the projector further including light source 1902, image forming panel 1906, and projection system 1908.

Although the optical surface of each of the cylindrical minute lenses constituting the condensing lens has not been specifically described, said surface can be made into an aspherical surface to thereby enhance the light condensing performance and greatly decrease the loss of the quantity of light and the occurrence of flare light.

As for the light condensing member, it may be comprised of a prism. Also, the light condensing member may be a lens to be rotated and a plurality of such members may be arranged in a checkered pattern. In such case, those of the total reflection mirror, the polarizing separating film and the polarizing rotational means (such as the half wavelength plate) which are discretely arranged can be arranged in conformity with the arrangement of the light condensing members.

The projectors using the polarizing units shown in FIGS. 2 and 4–16 are endowed with the above-described effects.

The present invention is constructed as described above and therefore achieves the following effects:

1. It h as the effect of utilizing the incident light efficiently and brightening the image projected by the projector.
2. The polarized state can be uniformized by a simple construction in which polarizing separating film, total reflection film and an element (film) creating a polarizing rotating action are provided on a plane parallel plate.
3. The polarizing conversion unit can be made compact and light in weight, whereby the projector can be made compact.

What is claimed is:

1. A polarizing conversion unit, comprising:

an illuminating system for supplying a lattice-like light pattern; and a polarizing element for converting said lattice-like light pattern into substantially dense polarized light;

said polarizing element having a polarizing dividing surface disposed on one surface of a plane parallel plate and a reflecting surface disposed on an other surface of the plane parallel plane, said lattice-like light pattern from said illuminating system entering obliquely from said one surface or said other surface, partial lights forming said lattice-like light being divided into first and second polarized lights different in polarized state from each other by said polarizing dividing surface, said first polarized light being directed in a first direction, said second polarized light being reflected by said reflecting surface and directed in said first direction, wherein a quarter wavelength optical phase plate is formed at a predetermined location on said one surface or said other surface of said plane parallel plate to vary the polarized state of at least one of said first and second polarized lights to thereby make the polarized states of said first and second polarized lights coincident with each other.

2. A polarizing conversion unit according to claim 1, wherein said quarter wavelength optical phase plate is formed on substantially the whole of said one surface or said other surface of said plane parallel plate.

3. A polarizing element, comprising:

a plane parallel plate having a first surface and a second surface, wherein light enters said polarizing element obliquely from said second surface;

a polarizing dividing surface, provided on substantially the whole of said first surface of the plane parallel plate, for dividing said light into reflected light and transmitted light differing in polarization direction from each other;

a reflecting surface, intermittently provided on said second surface of the plane parallel plate, for reflecting said reflected light and directing it in a direction substantially parallel to said transmitted light; and a polarizing rotating means for varying the polarization direction of said reflected light to thereby make it coincident with the polarization direction of said transmitted light, said polarization rotating means including a quarter wavelength optical phase plate that is provided on substantially the whole surface between said first surface of said plane parallel plate and said polarizing dividing surface.

4. A light polarization apparatus comprising:

a parallel plane plate having a light incidence surface and a light outgoing surface being mutually parallel;

a light polarizing and separating film formed over all of said light outgoing surface;

a quarter wavelength film formed over all of said light incidence surface; and a plurality of opening portions and a plurality of reflection film portions, the opening portions and the reflection film portions being alternatively arranged on said quarter wavelength film;

wherein non-polarized lights are incident on said parallel plane plate though said plurality of opening portions to be respectively separated into a P-polarized light transmitted through said light polarizing and separating film and an S-polarized light reflected by said light polarizing and separating film, the S-polarized light being changed into a P-polarized light by said plurality of reflection film portions and said quarter wavelength film and transmitted through said light polarizing and separating film.

5. An apparatus according to claim 4, wherein said parallel plane plate is inclined with respect to an optical path of said non-polarized lights, said parallel plane plate having a first prism array provided with a plurality of incidence surfaces at a side of said light incidence surface of said parallel plane plate, such that said non-polarized lights are perpendicularly incident on the plurality of incidence surfaces to be directed to said opening portions by way of the plurality of incidence surfaces, and a second prism array provided with a plurality of outgoing surfaces at a side of said light outgoing surface, such that said P-polarized light outgoes from the plurality of outgoing surfaces in a direction perpendicular to the plurality of outgoing surfaces.

6. An apparatus according to claim 5, wherein a lens array is provided at a light incidence side of said first prism array, said lens array changing light from a light source into a plurality of separated light beams corresponding to said plurality of incidence surfaces of said first prism array such that each of the light beams is directed to each of the corresponding incidence surfaces.

7. A projector provided with said polarization apparatus according to claim 4.

8. A projector provided with said polarization apparatus according to claim 6.

9. A projector provided with said polarization apparatus according to claim 6.

* * * * *